C. OAKFORD.
FRUIT CLEANING DEVICE.
APPLICATION FILED JAN. 11, 1915.
1,195,848.
Patented Aug. 22, 1916.
2 SHEETS—SHEET 1.
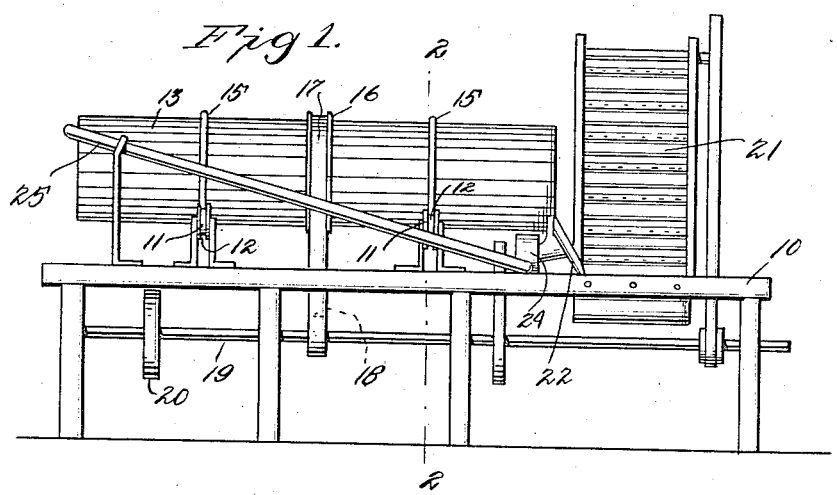
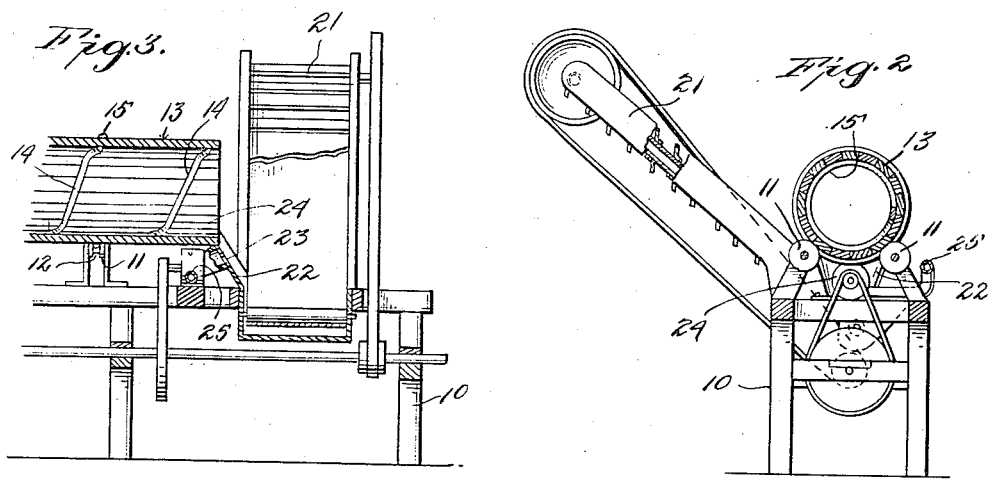
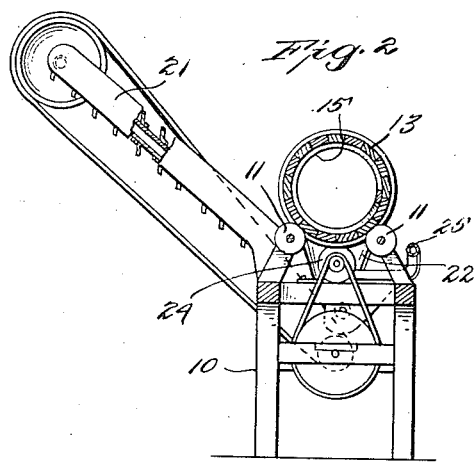
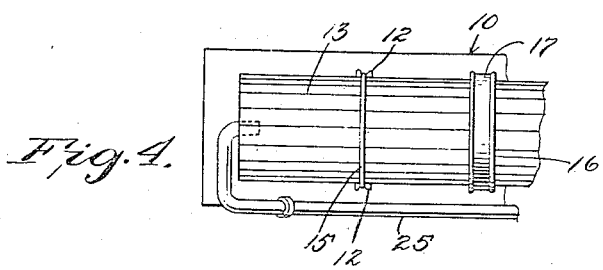
Witnesses
Inventor
C. Oakford
By
Attorneys C. OAKFORD.
FRUIT CLEANING DEVICE.
APPLICATION FILED JAN. 11, 1915.
1,195,848.
Patented Aug. 22, 1916.
2 SHEETS—SHEET 2.
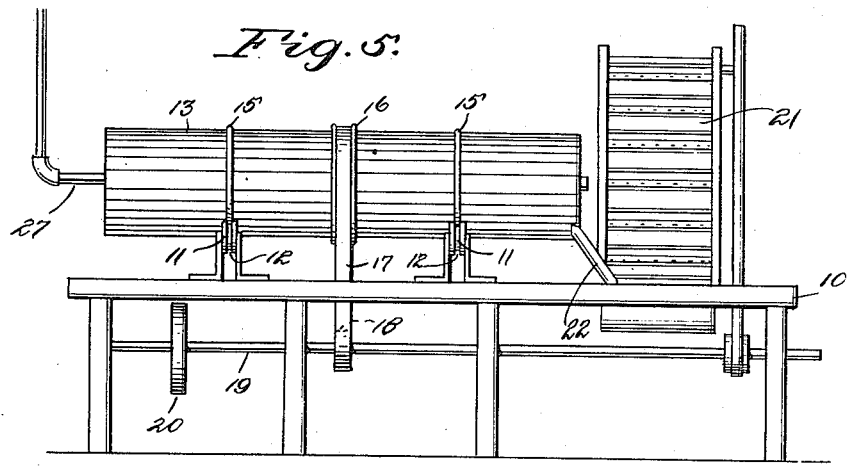
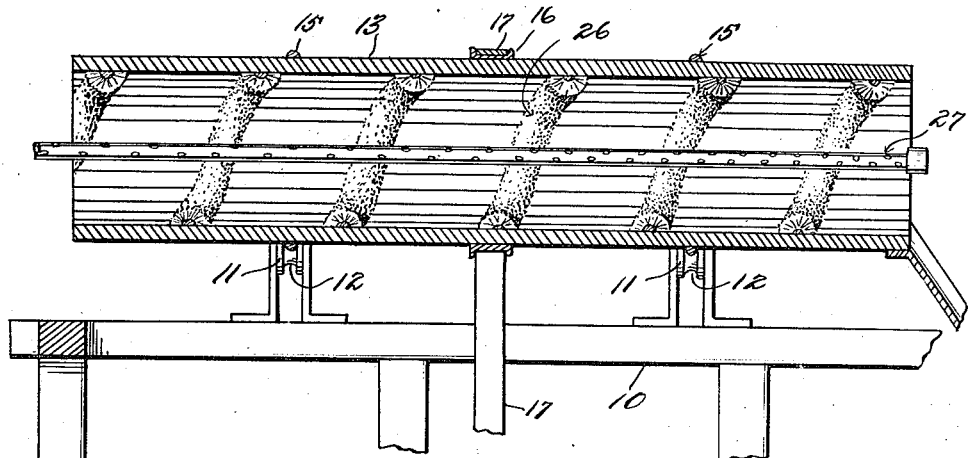
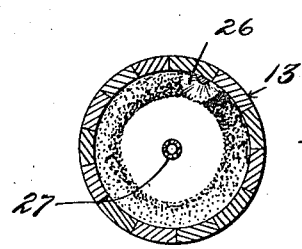

UNITED STATES PATENT OFFICE.

CHARLES OAKFORD, OF PLANT CITY, FLORIDA.

FRUIT-CLEANING DEVICE.

1,195,848.  Specification of Letters Patent.  Patented Aug. 22, 1916.

Application filed January 11, 1915. Serial No. 1,646.

*To all whom it may concern:*

Be it known that I, CHARLES OAKFORD, a citizen of the United States, residing at Plant City, in the county of Hillsborough, State of Florida, have invented certain new and useful Improvements in Fruit-Cleaning Devices; and I do hereby declare the following to be a full, clear, and exact description of the invention, such as will enable others skilled in the art to which it appertains to make and use the same.

This invention relates to fruit cleaning devices and particularly to devices for cleaning citrus fruits.

The object of the invention resides in the provision of a device through the instrumentality of which citrus fruit can be cleaned with great rapidity and efficiency, the device being particularly adapted to effect these ends without in any way injuring the fruit.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of the invention; Fig. 2, a transverse section on the line 2—2 of Fig. 1; Fig. 3, a partial longitudinal section of the device; Fig. 4, a partial plan view of the device; Fig. 5, a side elevation showing a modified form of the invention; Fig. 6, a transverse section of what is shown in Fig. 5, and Fig. 7, a longitudinal section of what is shown in Fig. 5.

Referring to the drawings the invention is shown as comprising a frame 10 upon which is rotatably mounted spaced pairs of rollers 11, the rollers of each pair being disposed side to side and all of said rollers being provided with circumferential grooves 12. Supported upon the rollers 11 is a tubular member 13 open at each end and provided interiorly with a spiral rib 14 for a purpose that will presently appear. The member 13 is provided with spaced circumferential ribs 15 which are adapted to travel in the grooves 12 of respective pairs of rollers 11 during rotation of the member 13. The member 13 has formed thereon a pulley 16 upon which travels a belt 17, the latter also traveling on a pulley 18 fixed upon a drive shaft 19 journaled in the frame 10. Also fixed upon the shaft 19 is a belt wheel 20 whereby the shaft may be connected with a suitable source of power. Mounted upon the frame 10 adjacent the discharge end of the member 13 is a suitable conveyer 21 operated through the medium of suitable connections with the shaft 19 and disposed in position to receive the clean fruit discharged from the member 13. Mounted at the end of the member 13 and forming substantially a continuation of said member is a casing 22 provided with a perforated top 23 over which the clean fruit will pass on its way to the conveyer 21. This casing 22 is connected to a fan 24 adapted to force a blast of air through a pipe 25 which latter discharges into the end of the member 13 remote from the casing 22. The fan 24 is operated through the medium of suitable connections with the shaft 19.

In utilizing the device a desired quantity of sawdust is placed within the member 13 at a point adjacent the end of the member remote from the casing 22. The fruit to be cleaned is then placed within the member 13 at the end of the latter into which the pipe 25 discharges and the member rotated through the medium of the rotation of the shaft 19. During this rotation of the member 13 the spiral rib 14 will gradually work the fruit and sawdust toward the delivery end of the member and the sawdust will operate to clean in the well known manner. As the sawdust and fruit are discharged from the member 13 the latter will pass to the conveyer 21 and the former will be drawn into the casing 22 by the fan 24 and delivered again into the opposite end of the member 13 by way of the pipe 25.

In the form of the invention illustrated in Figs. 5 to 7 the use of sawdust as the cleaning medium is dispensed with. In other words the fruit instead of being dry cleaned is wet cleaned. In this form of the invention there is provided within the member 13 a spiral brush 26 and extending through said member longitudinally is a pipe 27 connected with a suitable water supply and perforated so as to discharge water into the member 13. In the operation of this form of the invention the brush and water serve to efficiently clean the fruit.

What is claimed is:—

In a device of the class described, the combination of a frame, a tubular member rotatably mounted in the frame, means for rotating the member, a continuous spiral brush mounted on the inner side of said member, and means for discharging a cleaning liquid into said member.

In testimony whereof, I affix my signature, in the presence of two witnesses.

CHARLES OAKFORD.

Witnesses:
H. H. ROOT,
W. J. McDONALD.